Sept. 2, 1941.    I. E. MOUROMTSEFF ET AL    2,254,853
GLASS-TO-COPPER SEAL
Filed Dec. 1, 1939

INVENTOR
G. M. DINNICK
I. E. MOUROMTSEFF
BY
ATTORNEY

Patented Sept. 2, 1941

2,254,853

UNITED STATES PATENT OFFICE 2,254,853

GLASS-TO-COPPER SEAL

Ilia Emmanuel Mouromtseff, Montclair, and George M. Dinnick, Bloomfield, N. J., assignors to Westinghouse Electric & Manufacturing Company, East Pittsburgh, Pa., a corporation of Pennsylvania Application December 1, 1939, Serial No. 307,034

14 Claims. (Cl. 250—27.5)

Our invention relates to electronic discharge devices and especially to the seal between the glass casing and the copper feather edge of the anode.

An object of the invention is to prevent leaks through the feather edge of a glass-to-copper seal.

Other objects and advantages of the invention will be apparent from the following description and drawing in which.

Figure 1:
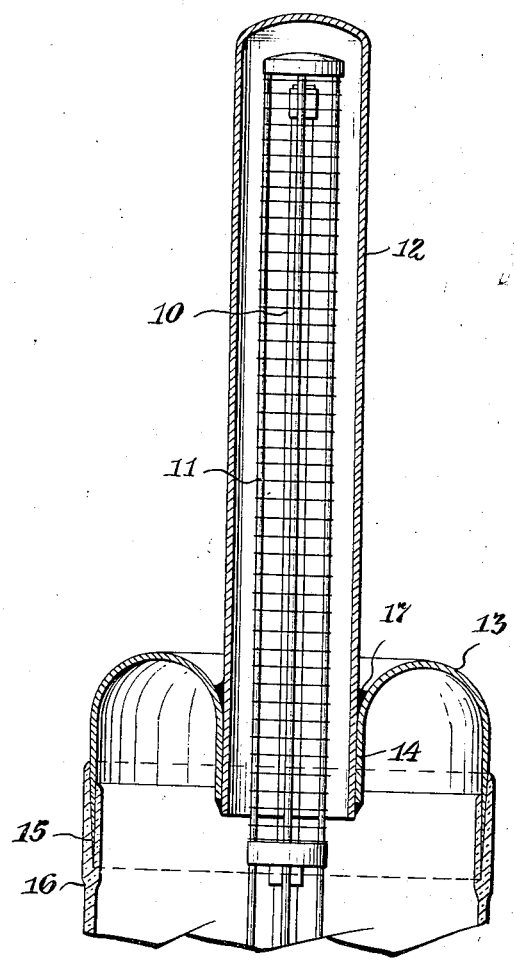
Figure 1 is a cross-section through a discharge device embodying the invention.

It was necessary to make certain changes in the exterior anode construction of our discharge devices, and we found that the tubes failed because of leaks. This changed construction involved the application of heat after sealing, and in this particular instance, the heat was required because of silver soldering of two parts of the exterior anode together. Such a construction is illustrated in Figure 1, where the cathode 10 and grid 11 are enclosed by an elongated copper tube 12. To the open end of this copper tubing is attached a reentrant or semi-doughnut-shaped copper cup 13. This copper cup 13 has a central opening whose wall 14 fits tightly against the side of the tube 12. The outside edge 15 of this cup is made into a feather edge as illustrated, and the glass insulation portion 16 sealed thereto, as is well known in the art.

Figure 2:
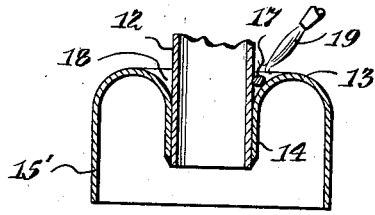
Figures 2, 3 and 4 are cross-sectional views illustrating successive steps in forming the copper for the seal according to the invention.

In the formation of the cup 13 to the tube 12, silver solder 17, as disclosed in Figure 2, is placed in the trough 18 between the inverted cup 13 and the tube 12 and a considerable amount of heat applied to the solder, such as by the flame 19. An extensive investigation was made to discover the cause of the leaks. The feather edge was placed under a microscope and it was found that the feather edge of the copper had a grain size as disclosed in Figure 5, in which the magnification is 40. We believe that the heat of the silver soldering process illustrated in Figure 2, caused the grain size to enlarge and that the oxidation caused by the heat applied throughout the process resulted in heavy oxidation along the boundaries of the grain, such as 20, 21, 22, etc., in Figure 5. The grains of the copper were so large that the oxide had a path from one side to the other and provided a ready means for leakage of gas therethrough. The growth of grain size and heavy oxidation of the grain boundaries will, of course, result from the application of heat for other purposes than merely that of silver soldering.

Figure 3:
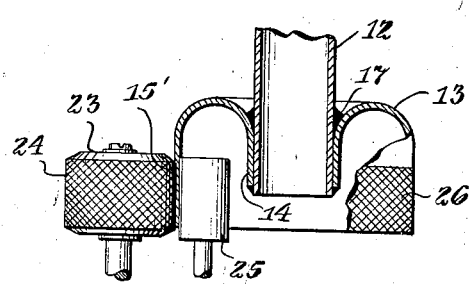
Figure 4:
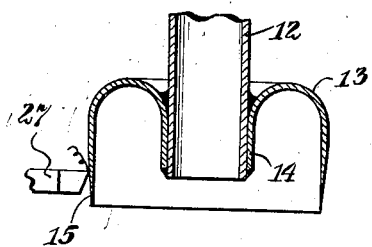
Figure 5:
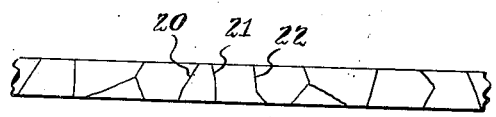
Figure 5 is a micro-photograph of copper of the prior art.

Our invention concerns breaking up of the grain size of the copper mechanically so that there will not be this ready path from one side of the copper to the other, as illustrated in Figure 5. The preferred method which we have found especially effective, is illustrated in Figure 3, where the side 15', before it is turned into a feather edge as illustrated in Figure 4, is knurled. Any preferred type of knurling machine may be used, and one standard type 23 with a cross-hatched knurling surface 24 is disclosed in Figure 3 bearing down upon the outside copper surface, which is supported by a roller 25 on the interior of the cup portion 13.

Figure 6:
Figure 6 is a micro-photograph of copper prepared according to the invention.

After this surface is knurled as shown on the right-hand side of Figure 3 at 26, the roughened portion is taken off and a feather edge formed thereon by any convenient cutting tool 27, as illustrated in Figure 4. An enlargement of the copper after this treatment, and after being heated in hydrogen at 800° C. for half an hour, is disclosed in Figure 6. It will be noted that the grain size in Figure 6 has been broken up into very tiny grains so that there is not the direct path from one side to the other of the copper as in Figure 5. Both Figures 5 and 6 have been magnified forty times, and the copper has been heated as in the process for forming the tube. As a result of this knurling process, the tubes so constructed did not leak. Investigation has disclosed that the average grain diameter of the copper of Figure 5 after soldering, is .006", which is about the thickness of the feather edge where the leaks occur. After knurling and heating as in glassing, the grain size refines to a maximum diameter of .0025", and the average size is .0020" or less, depending on the depth of the knurling. There is accordingly, at least two or three grains across the dangerous section.

Instead of knurling, other means of applying vibrations may be utilized provided these means are sufficient to break down the grain size. Occasional vibrations in ordinary manufacture, such as would be present in Fig. 4, are not sufficient.

It is apparent that many modifications may be made in the particurlar form of the preferred embodiment illustrated, and also in the manner of mechanically breaking up the grain size of the copper. Accordingly, we desire only such limitations to be imposed upon the invention as are within the spirit and scope of the following claims.

We claim:

1. The method of preparing copper for an airtight seal which comprises mechanically reducing the grain size of the copper and then sealing the edge into glass.

2. The method of preparing an exterior cylindrical copper electrode for a discharge device which comprises mechanically reducing the grain size in the region of the edge of the copper, feathering the edge and sealing the edge into glass.

3. The method of preparing an exterior cylindrical copper electrode for a discharge device which comprises knurling the region of the edge of the copper, feathering the edge of the copper and sealing the edge into glass.

4. The method of preparing an exterior electrode for a discharge device, which comprises reducing the size of the grains and then thinning the edge to the thickness of the diameter of several grains.

5. The method of preparing an exterior electrode which comprises joining a cylindrical tube to the inner reentrant portion of an annular reentrant cup-shaped copper ring, reducing the grain size at the edge of said ring, and feathering the edge to the thickness of the diameter of several grains.

6. A vacuum-tight seal for discharge devices, comprising copper with a feather edge, glass sealed to said feather edge, said feather edge having no direct cross-sectional oxide path favoring gas leakage through the feather edge.

7. A vacuum-tight seal for discharge devices, comprising copper with a feather edge, glass sealed to said feather edge, said feather edge having irregular grain boundary paths between the sides of the feather edge, whereby gas leakage is not favored through the feather edge.

8. A vacuum-tight seal for discharge devices, comprising copper with a feather edge, said feather edge having a plurality of grains between its sides and glass sealed to said feather edge.

9. A vacuum-tight seal for discharge devices, comprising copper with a feather edge of the order of .006 inch thickness, a plurality of copper grains across the .006 inch thickness, and a glass sealed to said feather edge.

10. An exterior electrode for discharge devices, comprising a copper cup having a feather edge substantially .006 inch thickness, and a plurality of copper grains across the .006 inch thickness.

11. An exterior electrode for discharge devices, comprising a closed end copper tube, a re-entrant cup-shaped ring, a vacuum tight silver solder joint between the inner edge of said ring and the open end of said tube, the outer edge of said ring having a feather edge.

12. An exterior electrode for discharge devices, comprising a closed end copper tube, a re-entrant cup-shaped ring having its inner edge secured vacuum tight to the open end of said tube, the outer edge of said ring having a feather edge and a plurality of copper grains across the thickness of said feather edge.

13. An exterior electrode of copper, having a body of the usual grain size, and a sealing edge of reduced grain size.

14. A copper cup-shape electrode for discharge devices, having a sealing edge of reduced grain sizes.

ILIA EMMANUEL MOUROMTSEFF.
GEORGE M. DINNICK.